US012270723B2

(12) United States Patent
Champavere

(10) Patent No.: US 12,270,723 B2
(45) Date of Patent: Apr. 8, 2025

(54) FIBER OPTIC CABLE LOCATION SYSTEM AND METHOD

(71) Applicant: Viavi Solutions France SAS, Plaisir (FR)

(72) Inventor: Andre Champavere, Saint-Bonnet les Oules (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/501,442

(22) Filed: Nov. 3, 2023

(65) Prior Publication Data

US 2024/0060852 A1 Feb. 22, 2024

Related U.S. Application Data

(63) Continuation of application No. 17/513,649, filed on Oct. 28, 2021, now Pat. No. 11,846,563, which is a (Continued)

(30) Foreign Application Priority Data

Mar. 28, 2019 (EP) ..................... 19305402

(51) Int. Cl.
*G01M 11/00* (2006.01)
*G01D 5/353* (2006.01)
(Continued)

(52) U.S. Cl.
CPC ..... *G01M 11/3145* (2013.01); *G01D 5/35361* (2013.01); *G01H 9/004* (2013.01);
(Continued)

(58) Field of Classification Search
CPC ......... G01M 11/3145; G01M 11/3109; G01M 11/3154; G01D 5/35361; G01H 9/004; G01V 1/226; G02B 6/562
See application file for complete search history.

(56) References Cited

U.S. PATENT DOCUMENTS 5,106,175 A * 4/1992 Davis .................... G01V 15/00
385/100
5,285,305 A 2/1994 Cohen et al.
(Continued)

FOREIGN PATENT DOCUMENTS

CN 106610502 A 5/2017
CN 108254798 A 7/2018
(Continued)

OTHER PUBLICATIONS

3M™ Dynatel™, "Cable/Pipe/Fault Advanced Locator 2250ME/2273ME Series" Operator's Manual, Sep. 2015, 64 pages.
(Continued)

*Primary Examiner* — Dominic J Bologna
(74) *Attorney, Agent, or Firm* — Mannava & Kang, P.C.

(57) ABSTRACT

In some examples, fiber optic cable location may include transmitting a coherent laser pulse into a device under test (DUT). Based on an analysis of reflected light resulting from the transmitted coherent laser pulse, changes in intensity of the reflected light caused by a plurality of signals directed towards the DUT may be determined. Further, based on the changes in intensity of the reflected light, a location of the DUT may be determined.

20 Claims, 5 Drawing Sheets

Related U.S. Application Data continuation of application No. 16/388,536, filed on Apr. 18, 2019, now Pat. No. 11,187,617.

(51) Int. Cl.
- *G01H 9/00* (2006.01)
- *G01V 1/22* (2006.01)
- *G02B 6/46* (2006.01)

(52) U.S. Cl.
CPC .... *G01M 11/3109* (2013.01); *G01M 11/3154* (2013.01); *G01V 1/226* (2013.01); *G02B 6/562* (2023.05)

(56) References Cited

U.S. PATENT DOCUMENTS

| | | | |
|---|---|---|---|
| 5,457,998 | A | 10/1995 | Fujisaki et al. |
| 6,194,706 | B1 | 2/2001 | Ressl |
| 7,800,743 | B1 | 9/2010 | Huffman et al. |
| 8,264,226 | B1 | 9/2012 | Olsson et al. |
| 9,316,762 | B2 | 4/2016 | Barfoot et al. |
| 10,274,632 | B1 | 4/2019 | Olsson et al. |
| 11,060,950 | B1 | 7/2021 | Xia et al. |
| 11,187,617 | B2 | 11/2021 | Champavere |
| 11,846,563 | B2 * | 12/2023 | Champavere ...... G01D 5/35361 |
| 2007/0264012 | A1 | 11/2007 | Healey et al. |
| 2010/0302531 | A1 | 12/2010 | Huffman et al. |
| 2013/0222811 | A1 * | 8/2013 | Handerek .......... G01M 11/3127 356/477 |
| 2014/0362668 | A1 | 12/2014 | Mcewen-King |
| 2015/0098673 | A1 | 4/2015 | Barfoot et al. |
| 2016/0091465 | A1 | 3/2016 | Cooper et al. |
| 2016/0169712 | A1 * | 6/2016 | Farhadiroushan .......... G01D 5/35306 |
| 2018/0267201 | A1 * | 9/2018 | Lewis ..................... B61L 1/166 |
| 2020/0124735 | A1 * | 4/2020 | Huang ................. G01H 9/004 |
| 2020/0149952 | A1 | 5/2020 | Hveding et al. |

FOREIGN PATENT DOCUMENTS

| | | |
|---|---|---|
| CN | 208623671 U | 3/2019 |
| KR | 101899079 B1 | 9/2018 |

OTHER PUBLICATIONS

Gail Leach Carvelii, "Use an underground cable locator to find buried cable", posted online on Aug. 1, 1997, 6 pages.

Megadepot, "A Guide to Pipe and Cable Locating", posted online on Apr. 27, 2015, 5 pages.

Paigewire.com, "Wire, Pipe & Fault Locators and Markers", retrieved online on Apr. 19, 2019, 2 pages.

Stanlay, "DXL2 Pipe & Cable Locator Kit", retrieved online on Apr. 19, 2019, 16 pages.

"Communication pursuant to Article 94(3) EPC" for European Application No. 19220009.5, mailed Sep. 26, 2024, 11 pages.

* cited by examiner

400

---

TRANSMIT A COHERENT LASER PULSE INTO A DEVICE UNDER TEST (DUT)
402

↓

DETERMINE, BASED ON AN ANALYSIS OF REFLECTED LIGHT RESULTING FROM THE TRANSMITTED COHERENT LASER PULSE, CHANGES IN INTENSITY OF THE REFLECTED LIGHT CAUSED BY A PLURALITY OF SIGNALS DIRECTED TOWARDS THE DUT
404

↓

DETERMINE, BASED ON THE CHANGES IN INTENSITY OF THE REFLECTED LIGHT, A LOCATION OF THE DUT
406

*FIG. 4*

FIBER OPTIC CABLE LOCATION SYSTEM AND METHOD

PRIORITY

This application is a Continuation of commonly assigned and co-pending U.S. patent application Ser. No. 17/513,649, filed Oct. 28, 2021, which is a Continuation of commonly assigned and patented U.S. patent application Ser. No. 16/388,536, filed Apr. 18, 2019, which claims priority under 35 U.S.C. 119 (a)-(d) to European patent application number 19305402.0, having a filing date of Mar. 28, 2019, the disclosures of which are hereby incorporated by reference in their entireties.

BACKGROUND

A fiber optic cable may include one or more optical fibers. The optical fibers may transmit light from a source to a destination. The optical fibers may be disposed in a protective layer that may be formed of plastic or another suitable material. Once the fiber optic cable is placed at a site, the cable may need to be located, for example, for maintenance, service connection, etc.

BRIEF DESCRIPTION OF DRAWINGS

Features of the present disclosure are illustrated by way of example and not limited in the following figure(s), in which like numerals indicate like elements, in which:

FIG. 4 illustrates a flowchart of an example method for fiber optic cable location determination in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Fiber optic cable location systems and methods for fiber optic cable location determination are disclosed herein. The systems and methods disclosed herein provide for implementation of a signal analyzer and a mobile signal generator to locate buried nonmetallic cables, such as fiber-optic cables.

With respect to location of buried cables, a conductive component of a cable may be utilized as an antenna to detect the cable. In this regard, inductive or capacitive coupling may be utilized to detect the cable location for cables that include, for example, a metallic wire embedded in the cable or in a vicinity of the cable. For cables that do not include such conductive components, it is technically challenging to detect such cables, for example, when such cables are buried underground.

The systems and methods disclosed herein address at least the aforementioned technical challenges by utilizing a signal analyzer, which is operatively connected to a device under test (DUT) that may include a fiber optic cable, to transmit a coherent laser pulse into the DUT. The signal analyzer may determine, based on an analysis of reflected light resulting from the transmitted coherent laser pulse, changes in intensity of the reflected light caused by a plurality of signals generated by a mobile signal generator. The signal generator may further transmit, to the mobile signal generator, the changes in intensity of the reflected light to determine a location of the DUT.

According to examples disclosed herein, the systems and methods disclosed herein may be utilized to locate any type of DUT that includes a minimum of a single mode fiber, such as a telecom fiber-optic cable, hybrid copper/fiber cables, sensing cables, a distributed temperature sensing (DTS) monitored power cable, a pipeline with an optical fiber, etc.

Figures 1A, 1B:
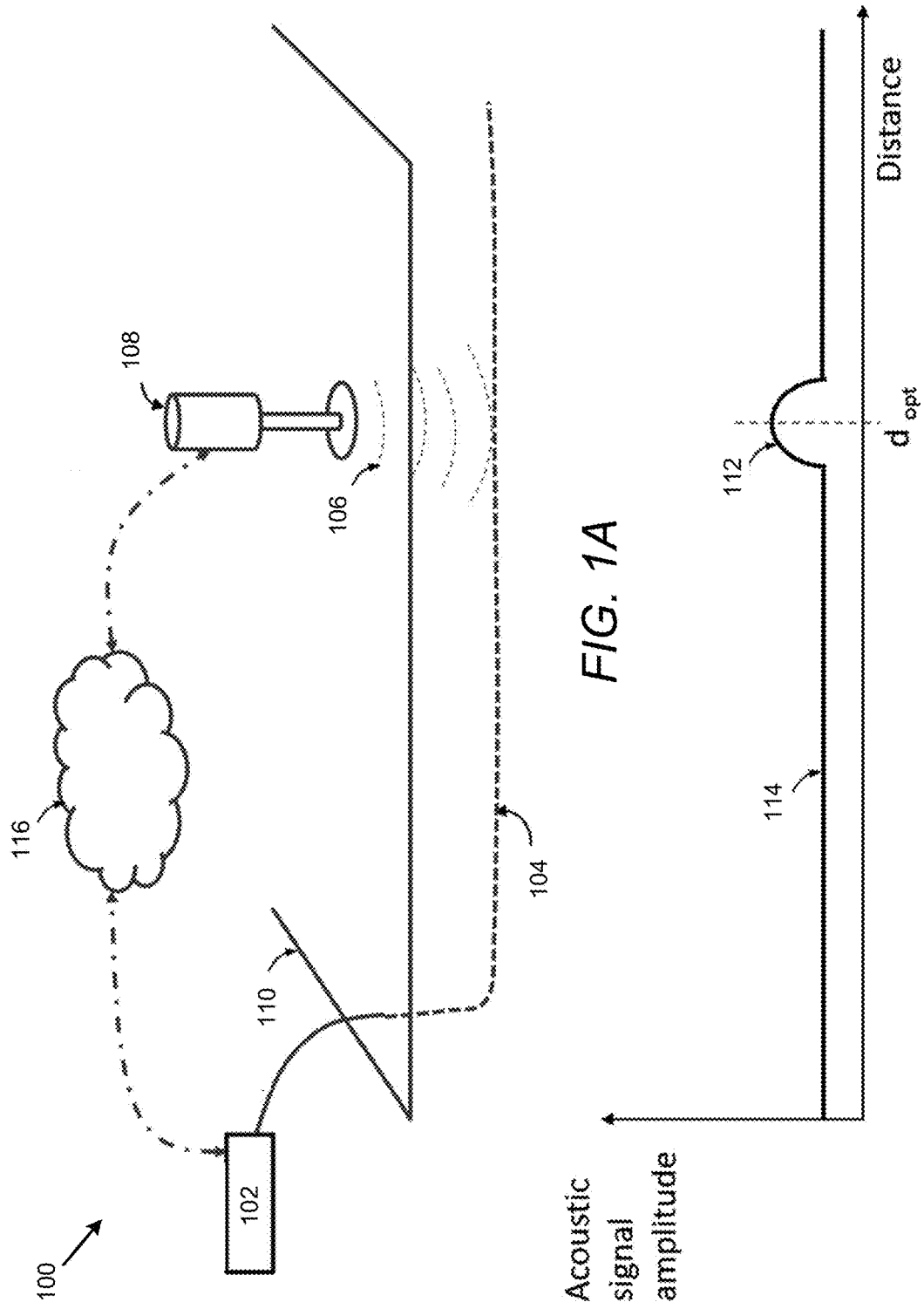
FIG. 1A illustrates an operational layout of a fiber optic cable location system in accordance with an example of the present disclosure.
FIG. 1B illustrates acoustic signal amplitude measurement to illustrate operation of the fiber optic cable location system of FIG. 1 in accordance with an example of the present disclosure.

FIG. 1A illustrates an operational layout of a fiber optic cable location system (hereinafter also referred to as "system 100") in accordance with an example of the present disclosure. Further, FIG. 1B illustrates acoustic signal amplitude measurement to illustrate operation of the system 100 in accordance with an example of the present disclosure.

Referring to FIG. 1A, the system 100 may include a signal analyzer 102 operatively connected to a device under test (DUT) 104 to transmit a coherent laser pulse (not shown) into the DUT 104. The signal analyzer 102 may determine, based on an analysis of reflected light resulting from the transmitted coherent laser pulse, changes in intensity of the reflected light caused by a plurality of signals 106 (or a signal) generated by a mobile signal generator 108. In this regard, the mobile signal generator 108 may generate the plurality of signals 106 in a vicinity of the DUT 104. Further, the signal analyzer 102 may transmit, to the mobile signal generator 108, the changes in intensity of the reflected light to determine a location of the DUT 104.

According to examples disclosed herein, the DUT 104 may include a fiber optic cable. In this regard, the DUT 104 may be disposed underground or may be disposed above ground.

According to examples disclosed herein, the plurality of signals 106 generated by the mobile signal generator 108 may include sound, vibration, and other such signals.

According to examples disclosed herein, the signal analyzer 102 may determine, based on the analysis of reflected light resulting from the transmitted coherent laser pulse, changes in intensity of the reflected light caused by the plurality of signals 106 generated by the mobile signal generator 108 by determining, based on the analysis of reflected light using coherent Rayleigh optical domain reflectometry, changes in intensity of the reflected light caused by the plurality of signals 106 generated by the mobile signal generator 108.

According to examples disclosed herein, the signal analyzer 102 may transmit the coherent laser pulse into the DUT 104 at a wavelength that is different from a wavelength range of traffic associated with the DUT. In this regard, optical filtering may be utilized to avoid interference between a wavelength of the coherent light pulse and wavelength(s) of traffic associated with the DUT. For example, the system 100 may utilize wavelength division multiplexing to monitor the DUT 104 with a signal propagating therein. For example, the coherent laser pulse may be generated at 1625 nm, whereas traffic wavelength associated with the DUT 104 may be at 1550 nm.

According to examples disclosed herein, the signal analyzer 102 may transmit, to the mobile signal generator 108, the changes in intensity of the reflected light to determine the location of the DUT 104 by transmitting, to the mobile signal generator 108, the changes in intensity of the reflected light to determine, based on identification of a maximum signal level (e.g., as disclosed herein with respect to FIG. 1B) of a frequency tone emerging from a noise background, the location of the DUT 104.

According to examples disclosed herein, the signal analyzer 102 may determine a time of flight value from a location (e.g., a location of the signal analyzer 102) associated with transmission of the coherent laser pulse to the location of the DUT 104. Further, the signal analyzer 102 may determine, based on the time of flight value, a length of the DUT 104. For example, the time of flight value may be analyzed relative to a speed of light associated with the coherent laser pulse to determine the length of the DUT 104. In this regard, the length of the DUT 104 may be measured to within a few meters to several kilometers, for example.

According to examples disclosed herein, the signal analyzer 102 may detect a specified frequency tone associated with the plurality of signals 106 generated by the mobile signal generator 108. Further, the signal analyzer 102 may determine, based on analysis of the specified frequency tone, a message transmitted from the mobile signal generator 108 to the signal analyzer. For example, by using acoustic frequency modulation, a digital message may be transmitted from the mobile signal generator 108 to the signal analyzer 102, in a similar manner as transmission of information on a sound stimulus (e.g., sound frequency). For example, a specified frequency tone of xyz Hz, may represent a message for the signal analyzer 102 to disconnect from the DUT 104 upon the location of the DUT 104.

According to examples disclosed herein, the mobile signal generator 108 may be disposed in an unmanned aerial vehicle, a terrestrial vehicle, or another type of vehicle. In this regard, the mobile signal generator 108 may determine, based on the plurality of signals 106 generated during movement of the unmanned aerial vehicle or the terrestrial vehicle, points along the location of the DUT 104. Further, the mobile signal generator 108 may trace, based on the determined points along the location of the DUT 104, a layout of the DUT 104. According to another example, the unmanned aerial vehicle or the terrestrial vehicle may emit a non-audible sound signal that locates the DUT 104, and may then automatically (e.g., without human intervention) follow the DUT 104 along its length to trace a route of the DUT 104.

Operation of the system 100 is described in further detail with reference to FIGS. 1A-2.

Referring to FIG. 1A, the signal analyzer 102, which may also be referred to as a distributed acoustic or vibration signal measurement (DAVSM) device, may analyze the acoustic signals along the length of the DUT 104. The mobile signal generator 108, which may also be referred to as a mobile acoustic signal generator, may be moved at the surface of the ground 110 near the buried DUT 104 and generate the plurality of signals 106, which may also be referred to as acoustic reference signals. The signal analyzer 102 may detect the characteristic signals of the mobile signal generator 108 that reach the DUT 104, and may transmit this information to a user (not shown) of the mobile signal generator 108. Alternatively or additionally, the signal analyzer 102 may transmit the information to a user of the signal analyzer 102 (or the mobile signal generator 108) through, for example, a mobile device and an application. Thus, a user of the mobile signal generator 108 may move the mobile signal generator 108 to locate the DUT 104 by looking for a maximum signal level 112 (e.g., at the optimal distance $d_{opt}$) as shown in FIG. 1B. The maximum signal level 112 may represent a frequency tone of interest emerging from the noise background 114. In this regard, a user may trace a path of the plurality of signals 106 to follow the DUT 104 being located.

The mobile signal generator 108 may generate the plurality of signals 106, which may be referred to as a stimulus, that radiate away from a surface of contact of the mobile signal generator 108 with the ground, and towards the DUT 104. Alternatively, the mobile signal generator 108 may be disposed at a specified distance away from the surface of the ground. In this regard, different acoustic frequencies (e.g., tones) may be used to account for aspects such as different soil composition, types, and/or configuration of the buried DUT 104. The acoustic propagation properties of soil may be a function of factors such as soil moisture, composition, etc. Short frequencies may be used to reduce soil attenuation, but some components of the soil may impact the sound propagation (e.g., sound reflection).

The signal analyzer 102 may communicate with the mobile signal generator 108, for example, by a wireless connection 116, or by other transmission means that provides acceptable latency for real-time communication between the signal analyzer 102 and the mobile signal generator 108.

As disclosed herein, the signal analyzer 102 may determine, based on the analysis of reflected light using coherent Rayleigh optical domain reflectometry, changes in intensity of the reflected light caused by the plurality of signals 106 generated by the mobile signal generator 108. In this regard, the Rayleigh reflectometry based solution provided by the system 100 may provide positioning information on any buried (or unburied) DUT 104, irrespective of whether the DUT 104 includes a conductive component that may be utilized as an antenna to detect the DUT 104.

With respect to the Rayleigh reflectometry based detection of the plurality of signals 106 generated by the mobile signal generator 108, as disclosed herein, the signal analyzer 102 may transmit a coherent laser pulse into the DUT 104. In this regard, various scattering sites along the DUT 104 may cause the DUT 104 to act as a distributed interferometer. The intensity of the reflected light resulting from the coherent laser pulse may be measured as a function of time after the transmission of the coherent laser pulse. In this regard, a sound or vibration transmitted to the DUT 104 (e.g., from the plurality of signals 106) may be seen as a signal emerging from the noise background 114.

Figure 2:
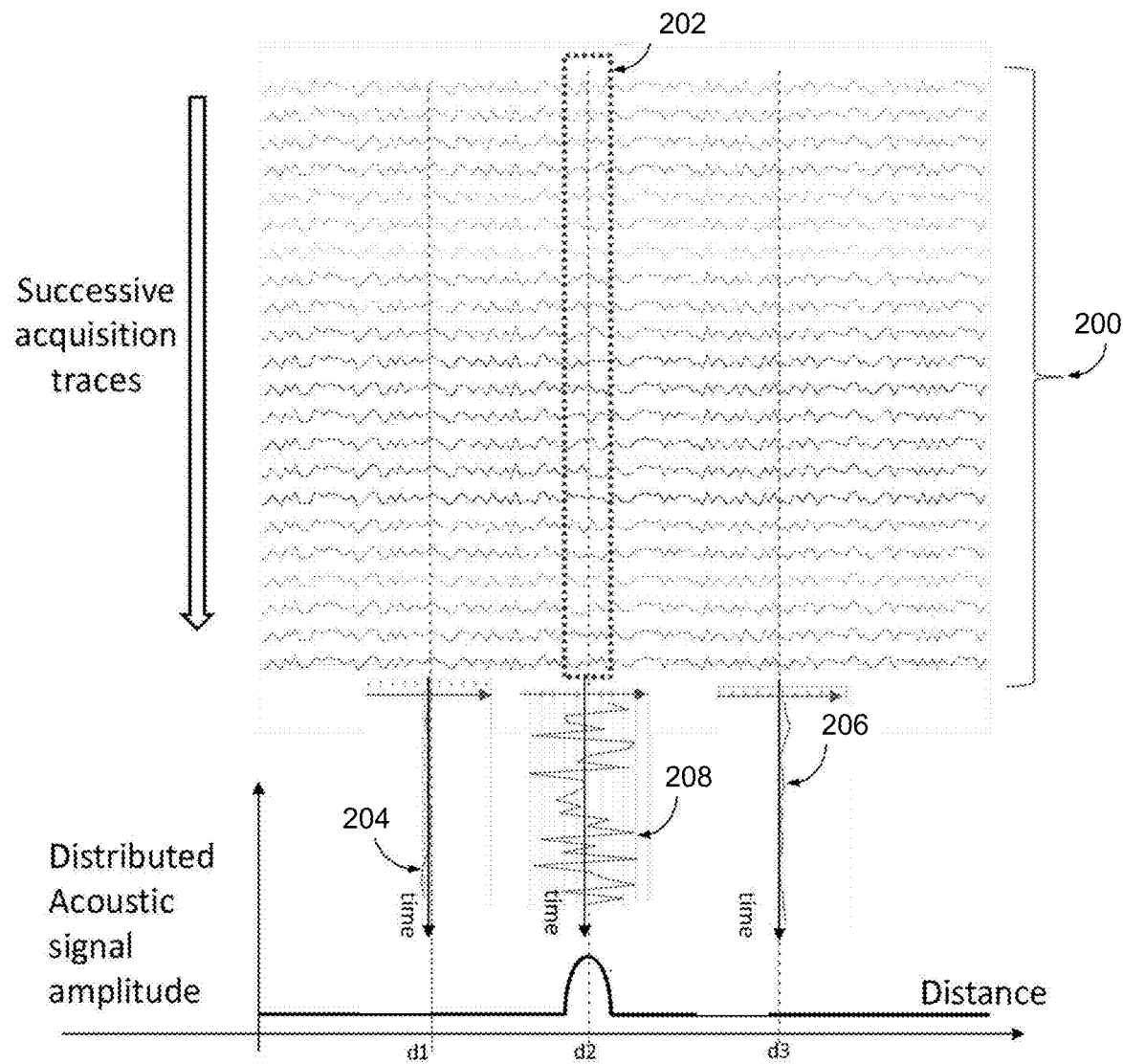
FIG. 2 illustrates further details of acoustic signal amplitude measurement to illustrate operation of the fiber optic cable location system of FIG. 1 in accordance with an example of the present disclosure.

For example, FIG. 2 illustrates further details of acoustic signal amplitude measurement to illustrate operation of the system 100 in accordance with an example of the present disclosure.

Referring to FIG. 2, with respect to the Rayleigh reflectometry based detection of the plurality of signals 106 generated by the mobile signal generator 108, when an optical signal propagates along an optical fiber, an elastic diffusion called Rayleigh scattering may be generated. The Rayleigh scattering signal may occur due to microscopic variations in the density of the optical fiber (e.g., microscattering centers). Rayleigh backscatter based optical time-domain reflectometers (OTDRs) may utilize this phenomena in telecommunications. Coherent fading noise may appear on OTDR traces as additional noise that may not be removed with averaging. Different techniques may be used to reduce this phenomena in order to increase signal to noise ratio. One such technique may include the use of low coherence optical sources to smooth this effect. Alternatively, distributed acoustic sensing (DAS) optical sources may include a relatively long coherence length that may lead to a high coherent fading noise. Under such conditions, an acoustic wave reaching the optical fiber may modify the phases of signal from the back scattering centers, and may thus modify the shape of the coherence noise. By analyzing the local variation of amplitude and possibly phase of this noise on successive traces, the signals 106 (e.g., which may include an acoustic wave), and also an associated amplitude and frequency content may be detected. The acoustic signal activity may be analyzed all along the length of the DUT 104. When analyzing several successive traces, sections of the DUT 104 impacted by the signals 106 may show amplitude and phase variation, whereas other sections may show a repeatable noise pattern. When translated in acoustic signal amplitude, the analysis of the noise background 114 (e.g., the distributed acoustic signal) may show the section of the DUT 104 impacted by a sound stimulus due to coherent noise variation.

As shown in FIG. 2, at 200, multiple successive traces may be acquired by the signal analyzer 102. The DUT segment stimulated by the signals 106 may be at distance d2, and the impact on the traces may be bound by the dotted line area 202. Inside the area impacted by the signals 106, the noise pattern may change from trace to trace, while outside this area the noise pattern may be relatively stable. The curves 204 (e.g., at d1), 206 (e.g., at d3), and 208 (e.g., at d2) may show variations of noise amplitude at a defined location from successive traces.

Outside of the acoustic stimulated area, the noise pattern may be relatively stable in shape leading to relatively low variation from trace to trace. In these areas, the sound related signal at curves 204 and 206 may be relatively lower compared to the sound related signal at curve 208 in the acoustically stimulated area where the noise changes in phase and amplitude. The signal at curve 208 may be analyzed to detect amplitude, and possibly the acoustic spectral content. If the sound stimulus is based on defined characteristics such as reference sound frequencies or tones, the analysis of the spectral content may facilitate location of the optical fiber section of interest around d2. The sound sampling frequency may depend on the rate of successive trace acquisitions that depends on the DUT length. In such conditions, a length of the DUT may be inversely proportional to the acoustic bandwidth.

The mobile signal generator 108 may include a visual and/or headset tracking system to locate the DUT 104. In this regard, the visual display of FIG. 1B may alternatively be provided in a bar graph, or variable frequency format to locate the DUT 104.

Figure 3:
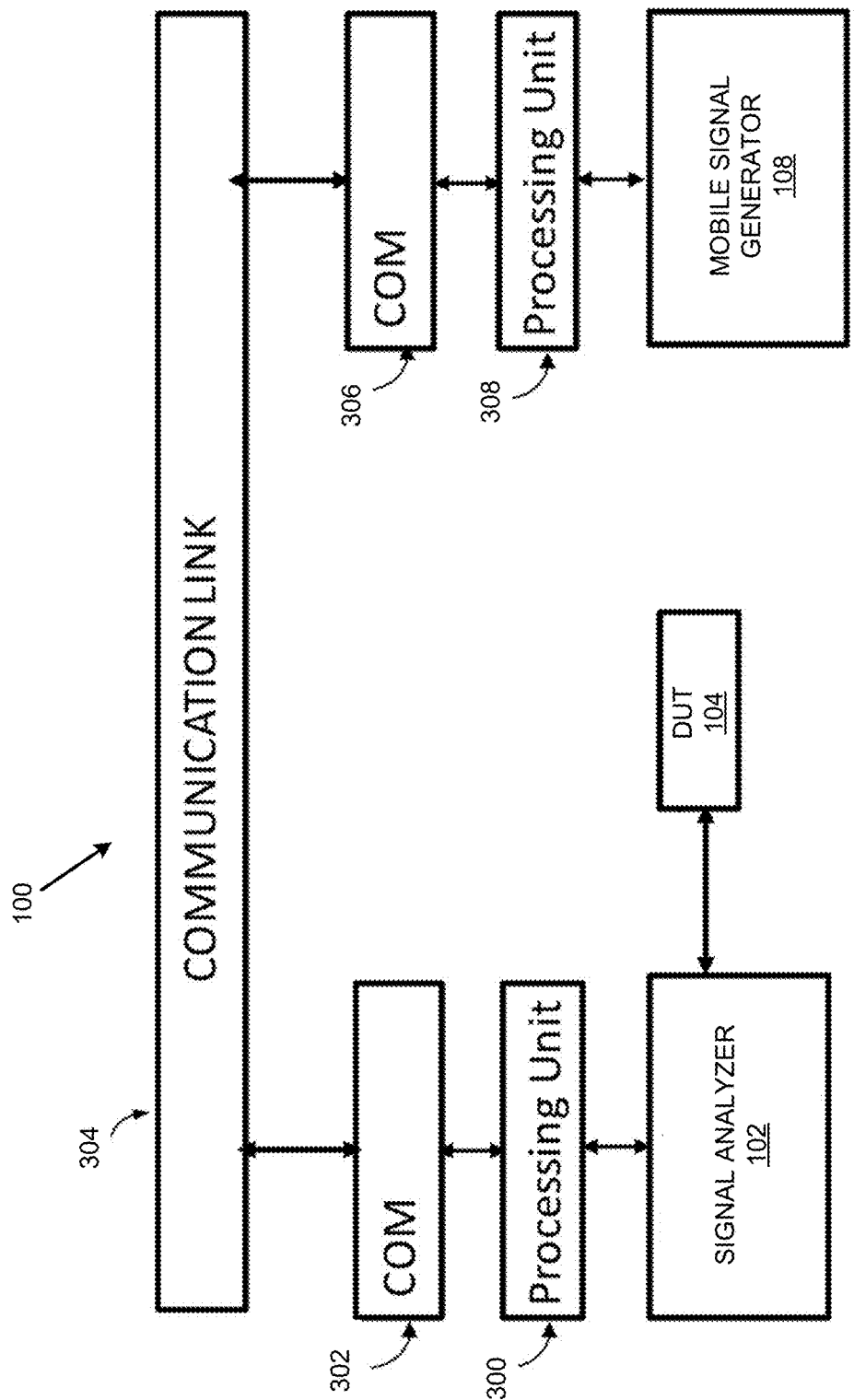
FIG. 3 illustrates details of components of the fiber optic cable location system of FIG. 1 in accordance with an example of the present disclosure.

FIG. 3 illustrates details of components of the system 100 in accordance with an example of the present disclosure.

Referring to FIG. 3, the signal analyzer 102 may be operatively connected to the DUT 104 to transmit a coherent laser pulse into the DUT 104. A processing unit 300 may analyze the acoustic data generated by the mobile signal generator 108 on the DUT 104. The processing unit 300 may use a communication interface 302 to send information through a communication link 304 to a communication interface 306 of the mobile signal generator 108. The processing unit 308 of the mobile signal generator 108 may receive the sound information from the communication interface 306, and convert this sound information to an indication to a user regarding the proximity of the DUT 104.

FIG. 4 illustrate a flowchart of a method 400 for fiber optic cable location determination, according to examples. The method 400 may be implemented on the signal analyzer 102 and/or the mobile signal generator 108 described above with reference to FIGS. 1A-2 by way of example and not limitation. The method 400 may be practiced in other systems.

Referring to FIGS. 1A-4, and particularly FIG. 4, at block 402, the method 400 may include transmitting a coherent laser pulse into a DUT 104.

At block 404, the method 400 may include determining, based on an analysis of reflected light resulting from the transmitted coherent laser pulse, changes in intensity of the reflected light caused by a plurality of signals directed towards the DUT 104.

At block 406, the method 400 may include determining, based on the changes in intensity of the reflected light, a location of the DUT 104.

Figure 5:
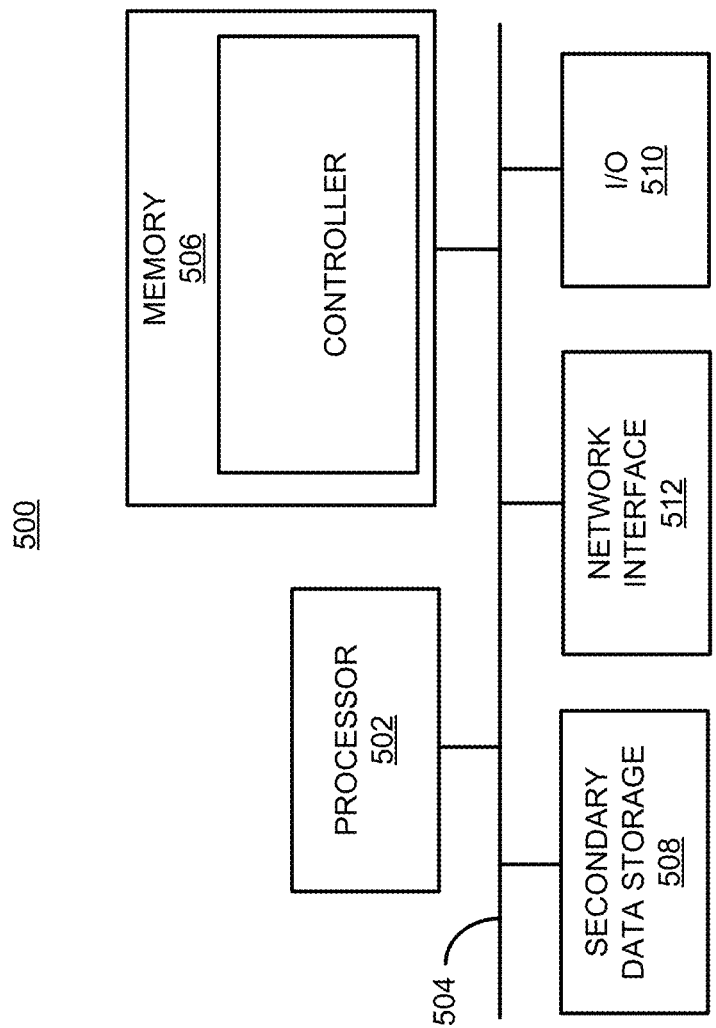
FIG. 5 illustrates a computer system, according to an example of the present disclosure.

FIG. 5 shows a computer system 500 that may be used with the examples described herein. The computer system may represent a platform that includes components that may be in a server or another computer system. The computer system 500 may be used as part of a platform for controllers of the signal analyzer 102 and/or the mobile signal generator 108 (generally designated controller). The computer system 500 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 may include a processor 502 that may implement or execute machine readable instructions performing some or all of the methods, functions and other processes described herein. Commands and data from the processor 502 may be communicated over a communication bus 504. The computer system may also include a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The main memory 506 may include the controller (e.g., for the signal analyzer 102 and/or the mobile signal generator 108) including machine readable instructions residing in the main memory 506 during runtime and executed by the processor 502.

The computer system 500 may include an input/output (I/O) device 510, such as a keyboard, a mouse, a display, etc. The computer system may include a network interface 512 for connecting to a network. Other known electronic components may be added or substituted in the computer system.

The processor 502 may be designated as a hardware processor. The processor 502 may execute operations associated with various components of the signal analyzer 102 and/or the mobile signal generator 108. For example, the processor 502 may execute operations associated with the controller (e.g., for the signal analyzer 102 and/or the mobile signal generator 108), etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A fiber optic cable location system, comprising:
    a mobile signal generator configured to:
        generate a plurality of vibrational signals directed towards an area where a location of a section of a fiber optic cable is to be determined;
        receive an indication of noise variation over time of intensity of reflected light resulting from a coherent laser pulse transmitted into the fiber optic cable and caused by the generated plurality of vibrational signals directed towards the area where the location of the section of the fiber optic cable is to be determined,
            wherein the noise variation over time is determined based on a sampling of the reflected light at a sampling frequency, and the sampling frequency depends on a length of the fiber optic cable; and
        determine, based on the indication of noise variation over time of intensity of reflected light, the location of the section of the fiber optic cable to be determined.

2. The fiber optic cable location system of claim 1, wherein the mobile signal generator is further configured to move while performing at least one of the generating a plurality of vibrational signals, the receiving an indication of noise variation over time, the determining the location of the fiber optic cable, or the presenting the visual display.

3. The fiber optic cable location system of claim 1, wherein the mobile signal generator is further configured to move automatically on a path of the fiber optic cable based on the determining the location of the fiber optic cable.

4. The fiber optic cable location system of claim 1, wherein the fiber optic cable is disposed under soil, and wherein the mobile signal generator is further configured to change a frequency of the generated plurality of vibrational signals based on one or more soil characteristics of the soil.

5. The fiber optic cable location system of claim 4, wherein the one or more soil characteristics comprise at least one of soil moisture, soil composition, or type of soil.

6. The fiber optic cable location system of claim 1, wherein the noise variation over time is coherent noise variation.

7. The fiber optic cable location system of claim 1, wherein a bandwidth of the sampled reflected light is inversely proportional to the length of the fiber optic cable.

8. The fiber optic cable location system of claim 1, wherein the mobile signal generator is further configured to present a visual display of a proximity of the determined location.

9. A fiber optic cable location determination method, comprising:
    generating a plurality of vibrational signals directed towards an area where a location of a section of a fiber optic cable is to be determined;
    receiving an indication of noise variation over time of intensity of reflected light resulting from a coherent laser pulse transmitted into the fiber optic cable and caused by the generated plurality of vibrational signals directed towards the area where the location of the section of the fiber optic cable is to be determined,
        wherein the noise variation over time is determined based on a sampling of the reflected light at a sampling frequency and the sampling frequency depends on a length of the fiber optic cable; and
    determining, based on the indication of noise variation over time of intensity of reflected light, the location of the section of the fiber optic cable to be determined.

10. The fiber optic cable location determination method of claim 9, further comprising:
    moving automatically on a path of the fiber optic cable based on the determining the location of the fiber optic cable.

11. The fiber optic cable location determination method of claim 9, further comprising:
    changing a frequency of the generated plurality of vibrational signals based on one or more soil characteristics of a soil under which the fiber optic cable is disposed.

12. The fiber optic cable location determination method of claim 11, wherein the one or more soil characteristics comprise at least one of soil moisture, soil composition, or type of soil.

13. The fiber optic cable location determination method of claim 9, wherein the fiber optic cable is buried underground, the method further comprising:
    changing a frequency of the generated plurality of vibrational signals based on a configuration of buried fiber optic cable.

14. The fiber optic cable location determination method of claim 9, wherein a bandwidth of the sampled reflected light is inversely proportional to the length of the fiber optic cable.

15. A system, comprising:
    a signal analyzer configured to:
        transmit a coherent laser pulse into a device under test (DUT) disposed under soil;
        receive, from the DUT, reflected light resulting from the transmitted coherent laser pulse;
        determine, based on an analysis of the reflected light, changes in intensity of reflected light caused by a plurality of vibrational signals directed towards an area where a location of a section of the DUT is to be determined; and
        transmit the determined changes in intensity of reflected light; and
    a mobile signal generator configured to:
        generate the plurality of vibrational signals directed towards the area where the location of the section of the DUT is to be determined, wherein the mobile signal generator changes a frequency of the generated plurality of vibrational signals based on one or more soil characteristics of the soil;

receive the determined changes in intensity of reflected light from the signal analyzer; and determine, based on the received determined changes in intensity of reflected light, the location of the section of the DUT.

16. The system of claim 15, wherein the signal analyzer comprises a distributed acoustic or vibration signal measurement (DAVSM) device.

17. The system of claim 15, wherein the mobile signal generator is further configured to present a visual display indicating a proximity of the determined location of the section of the DUT.

18. The system of claim 15, wherein the DUT includes a fiber optic cable.

19. The system of claim 15, wherein the mobile signal generator is further configured to move automatically on a path of the DUT based on the determining the location of the DUT.

20. The system of claim 15, wherein the one or more soil characteristics comprise at least one of soil moisture, soil composition, or type of soil.

* * * * *